United States Patent
Bachmann et al.

(10) Patent No.: US 7,606,818 B2
(45) Date of Patent: Oct. 20, 2009

(54) METHOD AND APPARATUS FOR AGGREGATING CHANGE SUBSCRIPTIONS AND CHANGE NOTIFICATIONS

(75) Inventors: Hans Ruediger Bachmann, Karlsruhe (DE); Vladislav Bezrukov, Sandhausen (DE); Timm Falter, Sinsheim (DE); Claus von Riegen, Wiesloch (DE); Alexander Zubev, Pazardjik (BG)

(73) Assignee: SAP AG, Walldorf (DE)

( * ) Notice: Subject to any disclaimer, the term of this patent is extended or adjusted under 35 U.S.C. 154(b) by 278 days.

(21) Appl. No.: 11/643,413

(22) Filed: Dec. 20, 2006

(65) Prior Publication Data

US 2008/0155038 A1  Jun. 26, 2008

(51) Int. Cl.
- G06F 17/00 (2006.01)
- G06F 17/30 (2006.01)
- G06F 17/40 (2006.01)
- G06F 15/16 (2006.01)
- H04L 12/04 (2006.01)
- H04L 7/00 (2006.01)

(52) U.S. Cl. .................. 707/101; 709/201; 709/202

(58) Field of Classification Search .................. 707/101; 709/201, 202
See application file for complete search history.

(56) References Cited

U.S. PATENT DOCUMENTS

| | | | |
|---|---|---|---|
| 2002/0174117 A1* | 11/2002 | Nykanen | 707/4 |
| 2003/0208572 A1* | 11/2003 | Shah et al. | 709/223 |
| 2004/0107196 A1* | 6/2004 | Chen et al. | 707/4 |
| 2004/0205104 A1* | 10/2004 | Harvey et al. | 709/200 |
| 2004/0225629 A1* | 11/2004 | Eder | 706/46 |
| 2005/0038771 A1* | 2/2005 | Sugihara et al. | 707/1 |
| 2005/0131912 A1* | 6/2005 | Lin et al. | 707/100 |
| 2005/0188088 A1* | 8/2005 | Fellenstein et al. | 709/226 |
| 2008/0126406 A1* | 5/2008 | Endabetla et al. | 707/103 R |
| 2008/0147418 A1* | 6/2008 | Salazar | 705/1 |

* cited by examiner

Primary Examiner—James Trujillo
Assistant Examiner—William Spieler
(74) Attorney, Agent, or Firm—Schwegman, Lundberg & Woessner, P.A.

(57) ABSTRACT

Methods of filtering change notifications to remove irrelevant notifications and transmitting the remaining notifications to a subscriber are described and claimed. Systems and software to implement related methods are also described and claimed.

19 Claims, 7 Drawing Sheets

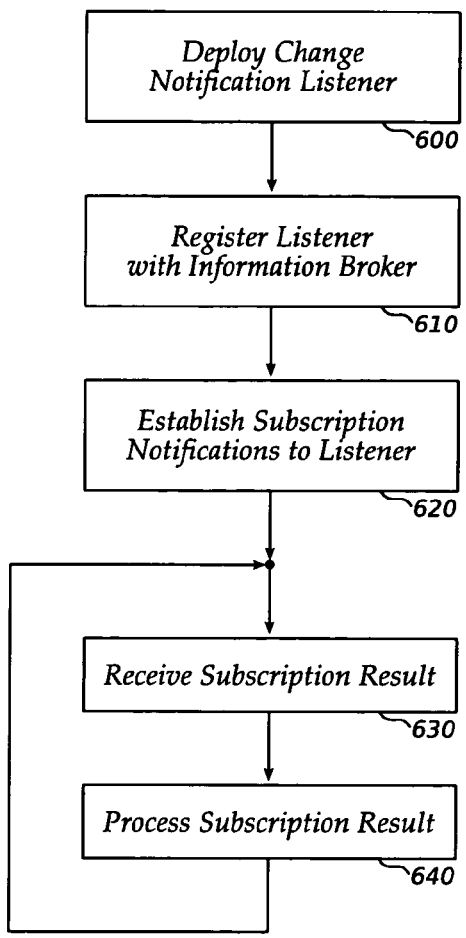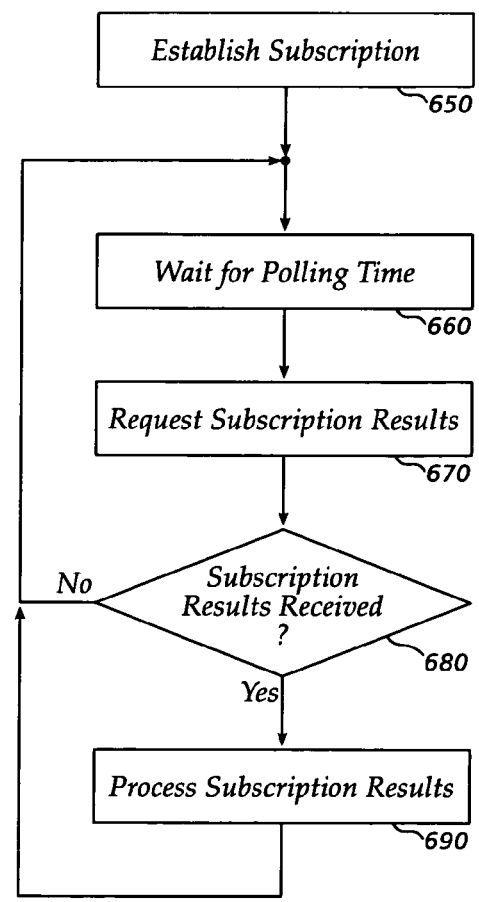
Fig. 6A
Fig. 6B

METHOD AND APPARATUS FOR AGGREGATING CHANGE SUBSCRIPTIONS AND CHANGE NOTIFICATIONS

FIELD

The invention relates to change management in distributed computing systems. More specifically, the invention relates to aggregating change subscriptions and change notifications in a distributed data processing environment.

BACKGROUND

Contemporary data processing activities are frequently distributed among a number of independent computer systems that use a communication fabric such as a local- or wide-area network to coordinate their operations. This model of data processing is generally more complex and somewhat less efficient than older arrangements where a complete, clearly-defined processing operation occurs at a single system and a "finished" data product may be transmitted to another location. In a distributed system, it is not uncommon for portions of closely-linked processing sequences to occur on different systems, with both partially-processed data and executable code passing between the systems over a communication link.

Distributed data processing services (also known as "web services") can simplify application integration and implementation of business processes. They provide an extensible framework for application-to-application ("A2A") integration. The simplification of the implementation of business processes is achieved in part by defining standardized mechanisms to describe, publish, locate and communicate with other applications. Web service registries provide a systematic way to publish and to find web services that may be suitable for the development of distributed applications to implement business processes. Web service technologies such as that described in the Universal Description Discovery & Integration ("UDDI") specification by the Organization for the Advancement of Structured Information Standards ("OASIS") (current version 3.0.2, published Oct. 19, 2004) allow the publishing and searching to occur in a standardized way.

Effective management of changes is a critical component of a successful web services infrastructure. Since a distributed application may combine services from a variety of sources (including sources not under the management or administration of the application's developer), the application may be vulnerable to changes in the underlying services. For example, if the provider of a service that the application relies upon makes an incompatible change to the service, the application itself may cease to function correctly. Techniques to learn about web service changes can help avoid application downtime, or at least streamline the process of troubleshooting an application failure that results from a change to an underlying web service.

SUMMARY

Embodiments of the invention permit a service provider that advertises and provides a distributed data processing service to notify its customers (processing service consumers) of changes to the service. Viewed from another perspective, embodiments permit a web service consumer to obtain relevant notifications about the services it uses. Change notifications can be selected by various parameters so that irrelevant notifications may be reduced or avoided.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIGS. 6A and 6B show two alternative methods of obtaining change notifications.

DETAILED DESCRIPTION

Figure 1:
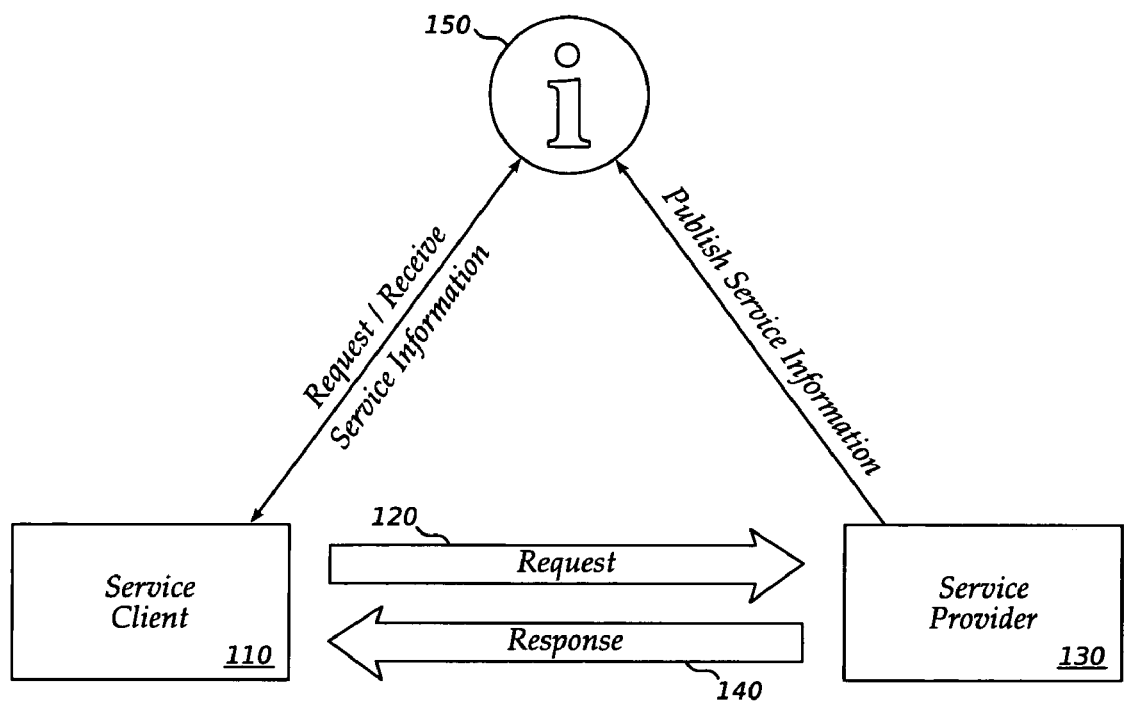
FIG. 1 shows a logical overview of an environment where embodiments of the invention may be used.

FIG. 1 shows a logical overview of an environment where a distributed data processing service can operate. The essential features of a basic distributed computation system are a service client 110, which transmits a request 120 to a service provider 130 and receives a response 140 in return. In some systems, including those that implement an embodiment of the invention, an information broker 150 is used to make it easier for service client 110 to find a provider that offers the desired service and to discover the protocol that provider requires. The Universal Description, Discovery and Integration ("UDDI") specification prepared by the international Organization for the Advancement of Structured Information Standards ("OASIS") consortium describes one possible information broker architecture. Other environments may provide similar functionality (for example, CORBA provides an Object Request Broker or "ORB" to act as an information clearinghouse). In the following material, the specific example of a UDDI server will be considered. Information broker 150 (or an associated system in a similar relationship to service client 110 and service provider 130) may provide other information and services to support embodiments of the invention. These other services will be described below.

Figure 2:
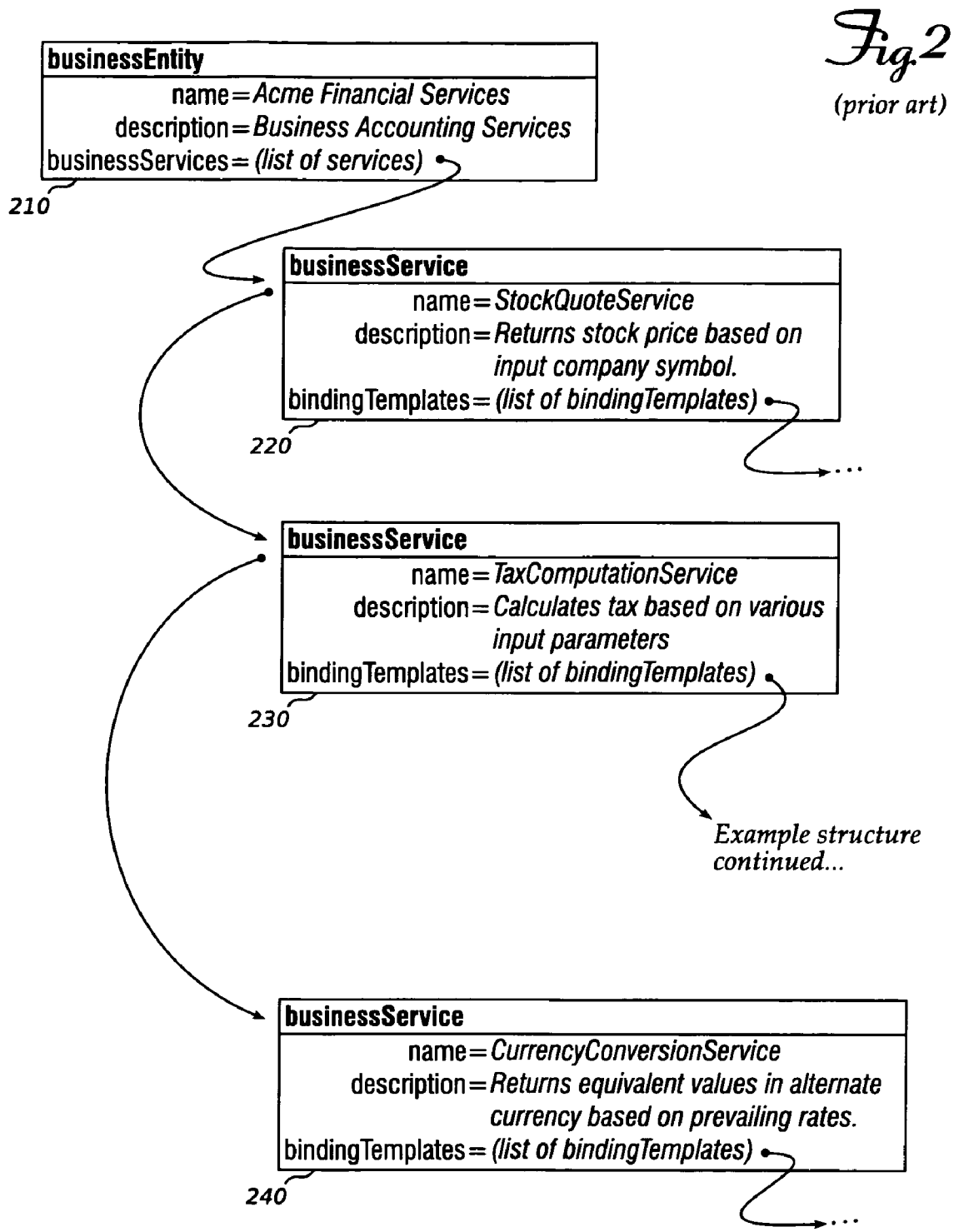
FIGS. 2 and 3 show relationships between data structures that are involved in embodiments of the invention.
Figure 3:
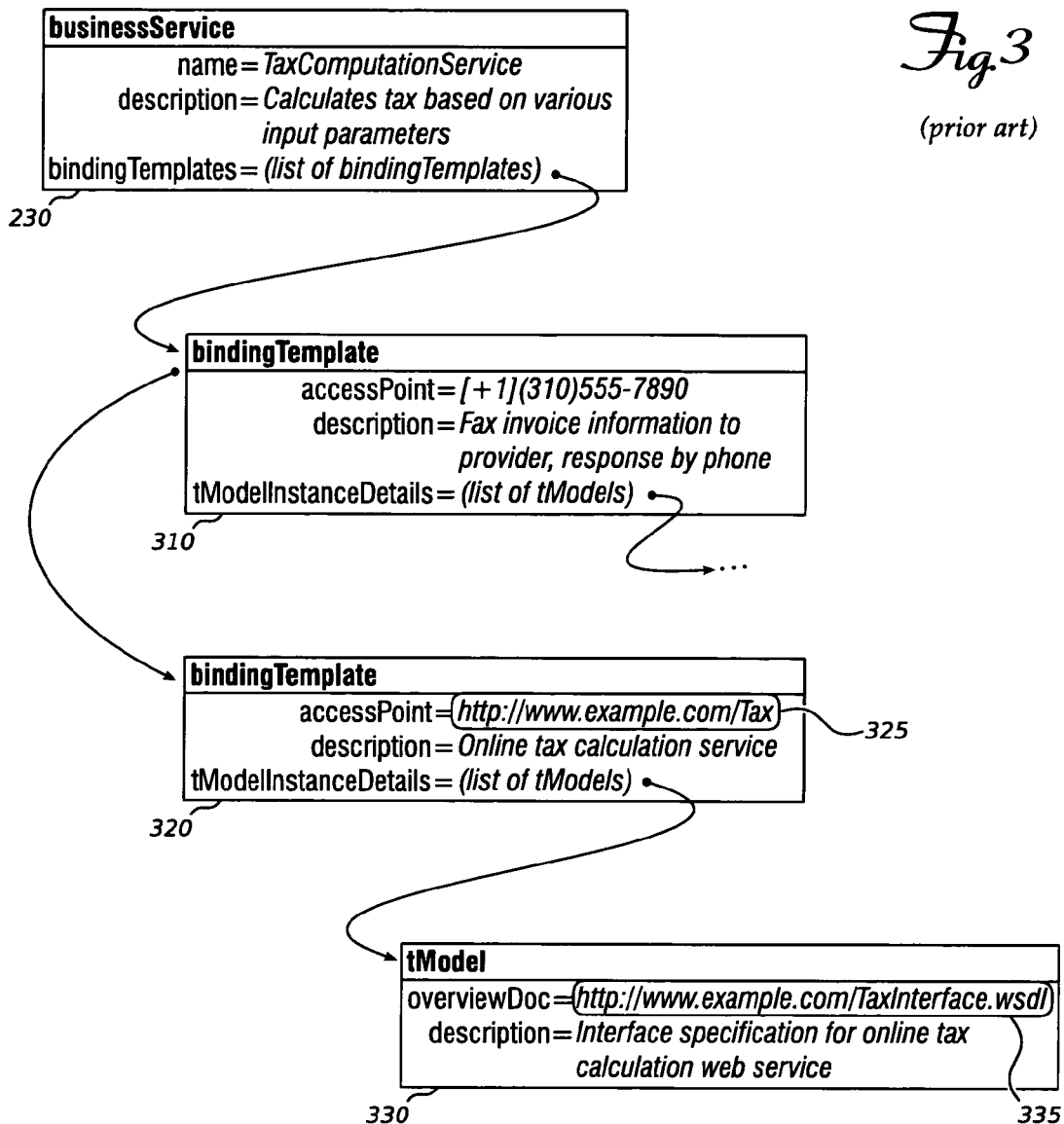
Figure 3:
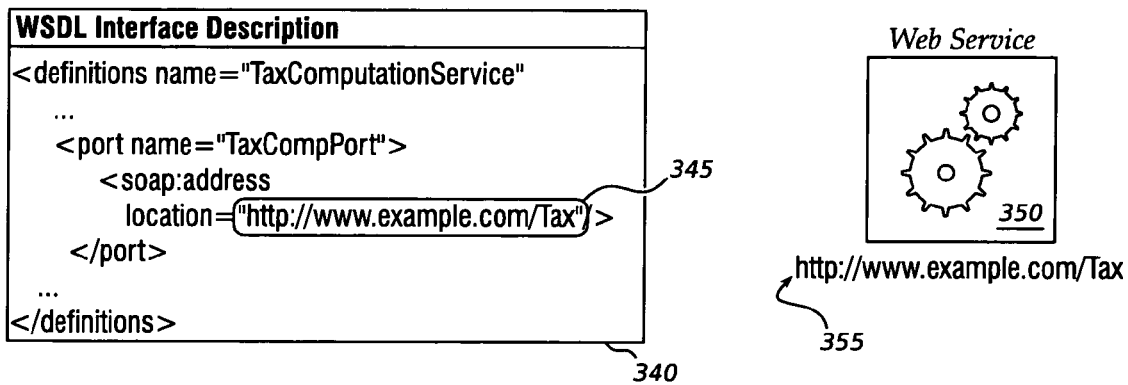

A UDDI registry, as described and specified by the OASIS consortium, maintains and responds to queries about several different types of data, all typically describing service-providing businesses and the services they provide. FIGS. 2 and 3 show several types of data structures that a UDDI registry maintains about a service provider. The example structures shown here describe a financial services corporation and some of the services it offers. The hierarchical structure discussed will resemble structures describing other companies listed in the registry.

The top level data structure is called a businessEntity 210. It contains general information about the company, including its name and a description of its business. Each businessEntity may contain a number of businessService records 220, 230, 240, each of which identifies by name a service offered by the company. Each businessService record may include a natural-language description of the service. Each businessService may also contain a number of bindingTemplates to describe ways of obtaining the named service. The TaxComputationService businessService structure 230 is examined in greater detail in FIG. 3.

FIG. 3 reproduces businessService structure 230 from FIG. 2, and shows two subsidiary bindingTemplate structures 310 and 320, which detail two ways a service client may obtain a tax computation. Each bindingTemplate structure includes an access point and a natural-language description, and may include a list of technical model ("tModel") structures. In this example, bindingTemplate 310 describes a fax-and-telephone service, where a client can fax an invoice to the provided access point (a fax telephone number) and receive the results of the tax computation by telephone. The tModelInstanceDetails (not shown for bindingTemplate 310) may provide further information about how to use this incarnation of the service.

BindingTemplate 320 describes an online (network-accessible distributed data processing) tax calculation service accessible at a Uniform Resource Locator ("URL") given as accessPoint 325. TModel 330, associated with binding template 320, provides another URL 335 where a client can obtain a Web Service Description Language ("WSDL") document 340. The WSDL document is an Extensible Markup Language ("XML") resource that contains a formal description of the interface of the web service 350 available at accessPoint 325, including such information as the number and type of input and output parameters and the URL ("port") of the service 345. XML is a prolix markup language; the fragment of WSDL document 340 shown in this Figure omits a great deal of information that the real document would contain.

Note that the hierarchical database structure shown in FIG. 3 is slightly simplified: those familiar with the UDDI specification will recognize that a few structural layers between bindingTemplate 320 and tModel 330 have been omitted. However, those layers are not important to the immediate discussion and would unnecessarily complicate the explanation of embodiments of the invention.

Information about distributed data processing services may be maintained in the hierarchical structure described with reference to FIGS. 2 and 3 by an information broker such as a UDDI registry. Other information brokers may also maintain similar hierarchical structures, since the information can be described conveniently in those terms. UDDI provides several primitive operations for tracking new, changed and deleted instances of the structures discussed: businessEntity, businessService, bindingTemplate and tModel. (Two other entities that were not discussed, relatedBusinessEntity and publisherAssertion, can also be monitored.) However, the provided operations have several shortcomings when applied to the common situation of a web services client tracking changes to a number of different services from different providers when the relationship between the services is not hierarchical, but instead is aggregative. A services client can either maintain many individual subscriptions to each individual businessService, bindingTemplate, or tModel that affects the distributed application, or a smaller number of subscriptions to the entire hierarchy of services offered by each service provider that contributes at least one service to the distributed application.

Figure 4:
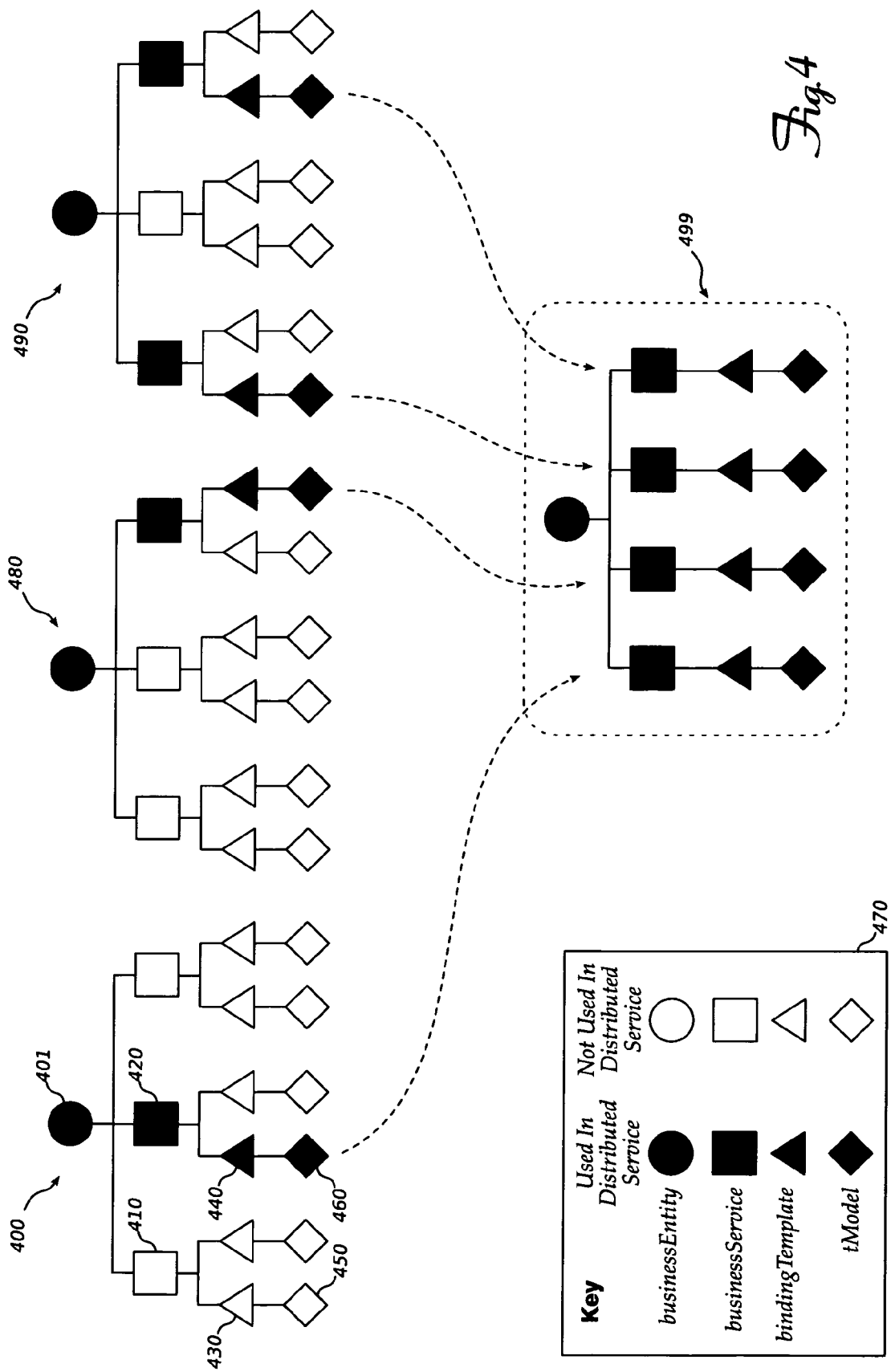
FIG. 4 shows how data from separate hierarchical set can be consolidated.

This situation is depicted in FIG. 4: the tree structures 400, 480 and 490 represent information broker data structures containing information about service providers, services, bindings and technical models. For example, element 400 represents a first businessEntity structure; elements 410 and 420 represent businessServices structures; elements 430 and 440 represent bindingTemplate structures; and elements 450 and 460 represent tModel structures. As shown in key 470, black-filled shapes represent data structures containing information of relevance to a distributed data processing service that is used by a distributed application, while white-filled shapes indicate data structures of no relevance to the application. Individual elements of hierarchies 480 and 490 are not labeled, but are represented according to the same plan. In this example, the distributed application relies on four different services from three service providers.

Using UDDI's built-in change notification procedures, the administrator of the distributed application could choose to subscribe separately to the four bindingTemplates, or to the three businessEntity structures. The first option requires maintaining many individual subscriptions (a distributed application may use dozens of web services), while the second option may result in many irrelevant change messages being received because of UDDI's policy of transmitting change notifications to subscribers by hierarchy (changes to structures hierarchically "below" a subscribed structure are propagated to the subscriber). Neither approach is ideal.

Instead, according to an embodiment of the invention, a service consumer may wish to subscribe to a "virtual businessEntity," indicated in this Figure as hierarchy 499. The virtual businessEntity includes only those portions of the UDDI database that are relevant to the distributed application. Thus, by registering a single subscription to the virtual businessEntity, the service consumer can obtain all the change messages of interest, and none of the irrelevant ones. Other virtual hierarchies can also be constructed by aggregating relevant portions of the UDDI database—an entire virtual businessEntity need not be constructed. For example, a virtual businessService may collect change notifications from part of a real businessService (filtering out change notifications from irrelevant bindingTemplates), and a virtual tModel can be created to track changes of the web service runtime or of Web service definitions as a whole. (The standard UDDI model does not produce change notifications for tModel changes.) Other virtual groupings are also possible: a virtual businessprocess can be defined to aggregate information about a group of web services that are relied upon by a distributed data processing application.

Note, however, that the structure of the virtual businessEntity is similar to the structure of real businessEntities—the same data structures and access functions can be used for both. Other virtual entities can also be built with existing UDDI data structures and procedures. In fact, the change notification aggregation functions of a virtual businessEntity or similar virtual grouping could be performed by a real, independent web service provider and offered as a distributed data processing service. This service would be different from the underlying web services in that it collects and distributes information about the underlying services, rather than performing the services directly. Therefore, the change notification service may be considered a derivative or "meta" web service that simply uses the underlying structures and functions of the UDDI system to implement a new system with greater power and flexibility. Most of the functionality described here can be implemented through the interfaces available from a standard UDDI server, but in some embodiments, the functions can be integrated into the UDDI server itself to achieve greater speed and reduced complexity (while preserving the standard UDDI external interfaces).

Figure 5:
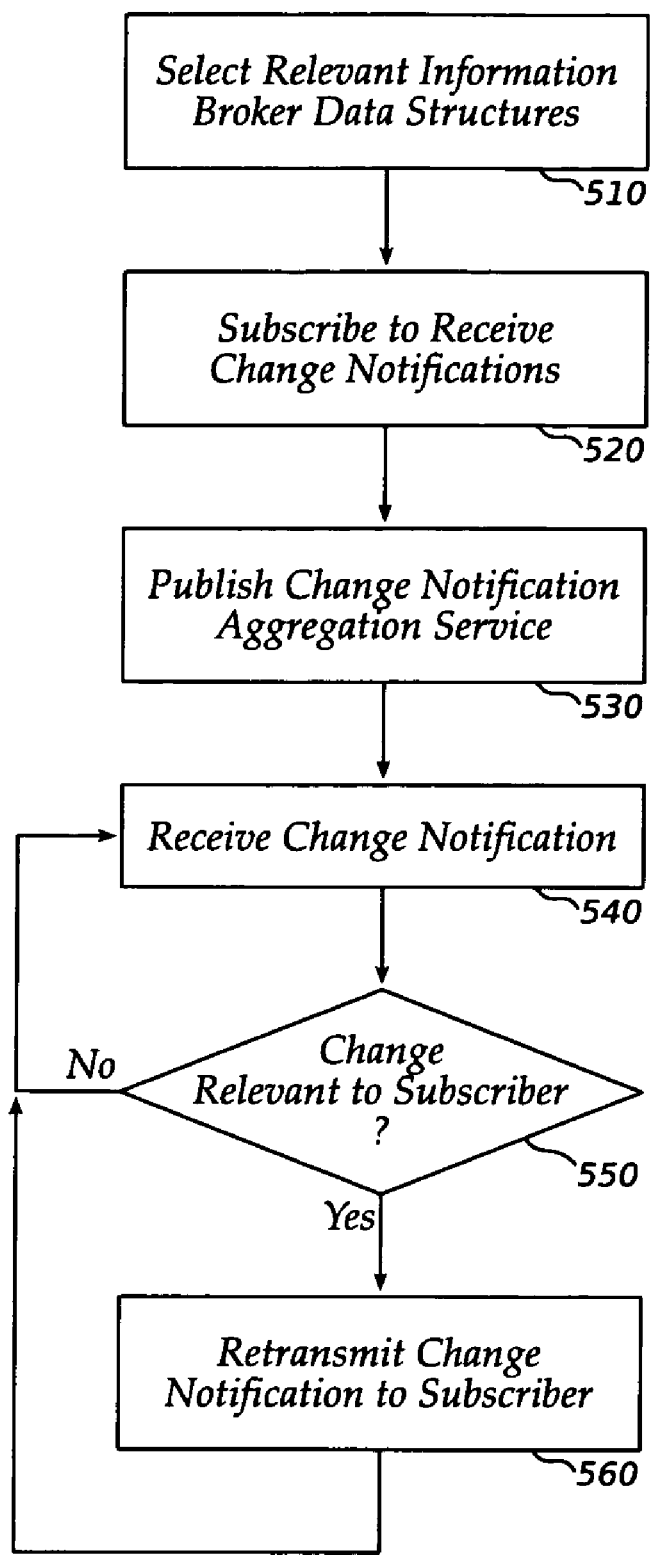
FIG. 5 is a flow chart showing how change notifications can be consolidated.

FIG. 5 outlines the operation of a change notification aggregation web service that may be of use to an operator of a distributed data processing application that relies on one or more web services. The following discussion refers to several different business entities, web services, and providers and consumers of those services. It is important not to confuse these different elements. The general relationships between the elements are: several web service providers provide distributed data processing services ("web services"). A distributed data processing application uses these services to perform its work, so it is a client of the web services—a "web services client." A meta web service provider operates a change notification aggregation and distribution web service. The application need not rely on the change notification service in performing its work; instead, an operator or administrator of the web services client uses the change notification service to help keep abreast of changes to the web services used in the application, without the inconvenience of managing multiple change notification subscriptions or sorting through irrelevant change notifications. The web service providers, meta web service provider, or web services client administrator may define the aggregated entities and specify how they are linked together (for change notification purposes).

In operation, one or more of the web services providers, meta web service provider, or web services client administrator selects relevant data structures from the information broker's database (510). The data structures represent aspects of the web services used by the application. For example, if the application uses the tax computation web service discussed in FIGS. 2 and 3, then bindingTemplate 320 and/or tModel 330 may be selected. Selections may be made and communicated to the meta web service provider in any convenient fashion. For example, the meta web service provider may accept identifiers of the data structures of interest, or may observe the operation of the distributed data processing application and automatically search for and select data structures related to the web services used by the application.

Next, the meta web service provider subscribes to receive notifications of changes to the selected information broker data structures (520). These subscriptions may be made through standard interfaces provided by the information broker. For example, if the information broker is a UDDI server, then the meta web service provider can use the "save_subscription" application program interface ("API") to arrange to receive change notifications. As discussed below, the change notifications may be received asynchronously: the UDDI server forwards notifications as they arise by electronic mail or by transmitting them to a notification listener; or synchronously: the meta web service provider polls the UDDI server periodically for all subscribed changes that occurred since a previous poll. In some embodiments, the meta web service is more tightly integrated with the UDDI server, so more efficient channels of communication may carry change notifications to the meta web service logic that aggregates the notices of interest and filters the irrelevant notices.

Once the meta web service provider has arranged to receive the change notifications of interest, it may publish information about the change notification aggregation service to the information broker (530). This may permit other interested web service clients to locate the meta service and to subscribe to receive aggregated notifications. The published information may be identifiable by a tModel-based label that specifies the aggregation level. Aggregates can be defined by the web service provider or by other entities with appropriate permissions.

Subsequently, the meta web service provider may receive a change notification (540). The notification is examined to see whether it is relevant to a subscriber to the meta web service (550), and if it is, the notification may be retransmitted to the subscriber (560) or stored pending a polling request from the subscriber (not shown). The relevance determination at 550 permits the meta web service provider to filter out change notifications that are received because of the information broker's hierarchical operation but that are not of interest to the operator of the distributed data processing application.

In addition to the change notifications generated during the normal course of the information broker's operation, the meta web service provider can provide a richer set of notification primitives. For example, a UDDI server's notifications may be limited to actual changes to the database structure (i.e. creation of new records and alteration or deletion of existing records). However, a web service provider may wish to communicate additional information about its services to web service consumers. For example, a provider may wish to discontinue a service, but may not wish to inconvenience consumers by terminating the service outright. The meta web service provider could extend the aggregated entities with a deprecation flag and provide a "deprecate" change notification to distribute a warning to users of the service. The deprecated service might continue to be provided during a transition period to permit web service clients to adapt their distributed data processing applications to use a new service.

The meta web service provider can also incorporate additional information in its aggregated change notifications to assist web service consumers in identifying required application modifications and in prioritizing engineering efforts. For example, change notifications may include a change token as described in co-pending U.S. patent application Ser. No. 11/541,352. The change token may provide information about a change in a discrete, machine-processable form (rather than as a natural-language text description). For example, a change token may permit the classification of changes into categories, each of which requires a clearly-defined response. There may be a change token to indicate that a change is backwardly-compatible, so that no change to the distributed data processing application is required; or to indicate that the change does require modifications to client applications.

Another useful avenue opened by an embodiment of the invention is the possibility of extending a change notification structure of the information broker to carry messages about changes occurring outside the broker's purview. For example, WSDL interface description 340 shown in FIG. 3 exists outside the data structures maintained by a UDDI server—there is only a link to the interface description in tModel 330. Therefore, in a standard UDDI implementation, changes within WSDL document 340 might go unreported to change notification subscribers. (Some information in the WSDL document is replicated in the UDDI structures, so changes to that information would be reported.) An embodiment of the invention could monitor relevant information that exists outside the information broker and use standard change reporting mechanisms to alert clients of changes.

The meta web service provider may construct virtual businessEntity structures like element 499 in FIG. 4. These structures may encode or represent correlations between arbitrary entities in the information broker database. Thus, logical relationships between entities that may be difficult or impossible to represent in a strictly hierarchical arrangement can be maintained by the meta web service for the benefit of web service consumers. Element 499 indicates this capability: portions of the hierarchical structure depicted at 499 are drawn from the three separate businessEntity hierarchies as shown by the dashed arrows.

Another way of looking at the aggregation of disparate data structures describing web services (and the change notifications that may be published regarding them) is that new virtual assemblages (not necessarily hierarchical) are created to reflect relationships between the data structures that are obscured by the businessEntity-centric hierarchy of the information broker. For example, a "System" group might aggregate information relevant to a distributed data processing application, while a "Component" group might aggregate information relevant to a particular type or class of web service. Both of these virtual assemblages may draw upon information located at various places in the information broker's native data structure, as well as information collected from other sources.

FIG. 6A outlines the operations of a change notification receiver operating asynchronously. First, a change client deploys a listener to receive notifications (600). The listener may be an electronic mail address to which notifications are sent, or a network addressable service to which notifications may be sent according to a registered protocol.

The listener is registered with the information broker (610). In the UDDI environment, this registration may involve creating a new bindingTemplate and linking it into a businessEntity/businessService hierarchy.

Once the listener is prepared, a subscription is created so that change notifications will be sent to the listener (620). The subscription may be done with the save_subscription API. (From a UDDI perspective, operations 610 and 620 are a single step.)

Later, as change notifications are received (630), the listener processes them (640).

FIG. 6B outlines the operations of a change notification receiver operating synchronously. In this arrangement, a listener need not be registered. Instead, the subscription is established (650) with save_subscription, but without a bindingTemplate describing the listener. Then, after waiting for a suitable polling interval to elapse (660), the information broker is queried for change notifications (670) since an earlier poll. If any notifications are received (680), they may be processed as desired (690).

Figure 7:
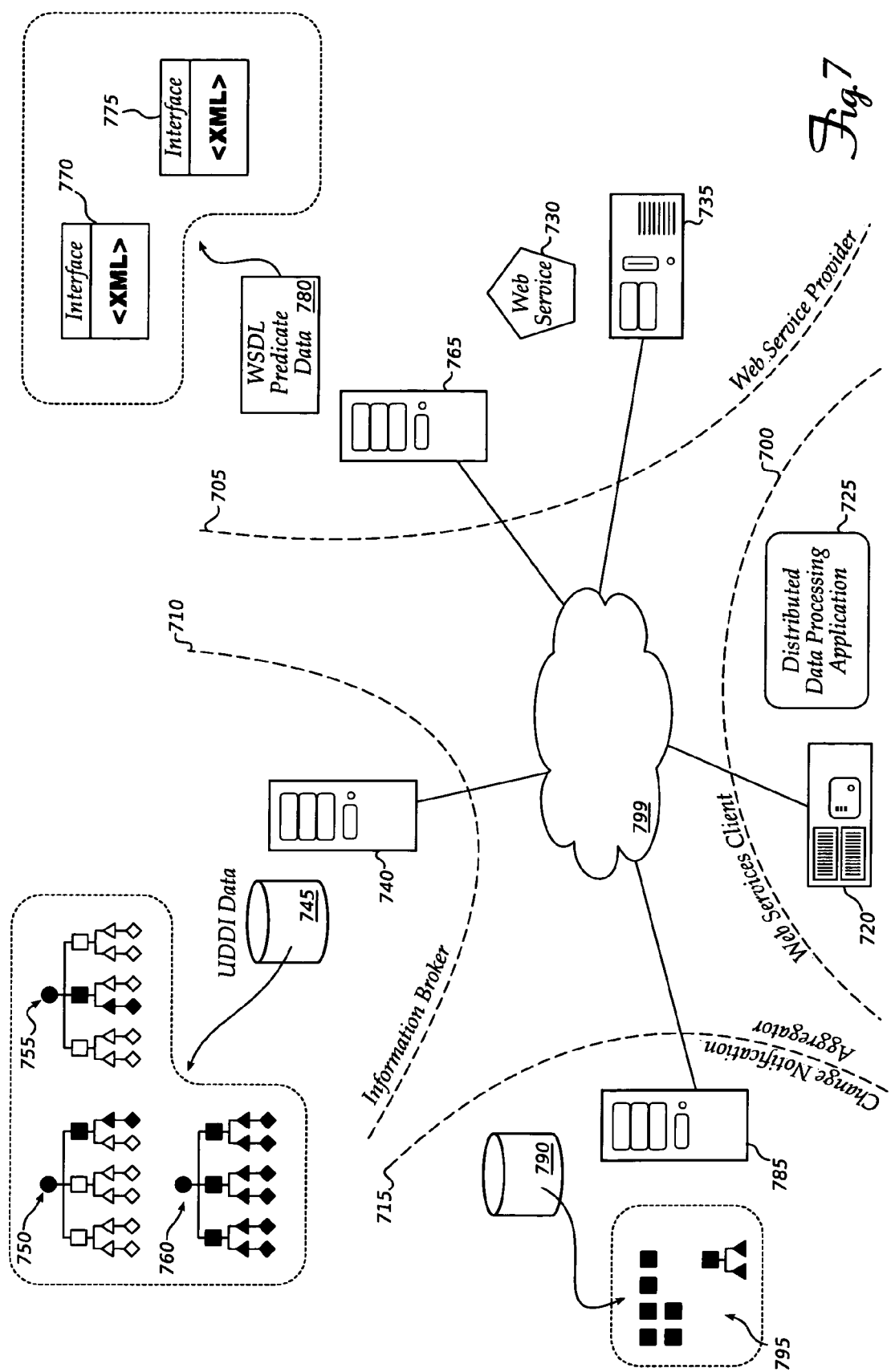
FIG. 7 provides a broad overview of the entities involved in embodiments of the invention.

FIG. 7 shows components that may be involved in an embodiment of the invention, separated into administrative domains. These domains, delineated by dashed lines, may include web services client 700, web service provider 705, information broker 710 and change notification aggregator 715. A system 720 at web services client 700 executes a distributed data processing application 725. Application 725 relies on distributed data processing services such as web service 730, which is available from system 735 at web service provider 705.

Information broker 710 may operate a number of systems to provide various information publishing, search, retrieval, and related functions. In this Figure, Universal Description Discovery & Integration ("UDDI") server 740 provides access to UDDI database 745 (database contents depicted here as hierarchical structures 750, 755 and 760).

Finally, system 785 at change notification aggregator 715 may implement the central operations of an embodiment of the invention by receiving, storing, manipulating and transmitting change information about various distributed data services. Some of this information may be stored locally in database 790 (information represented here as element 795).

Communication between various participating systems may occur over a distributed data network 799 such as the Internet.

Operating according to an embodiment of the invention, web service provider 705 may implement and deploy web service 730, and publish information about the service in UDDI database 745. Other information about web service 730 may be available from another system 765 at web service provider 705. FIG. 7 shows that WSDL predicate data 780 can be turned into XML interface documents 770, 775 and provided to a potential web services client that requests information about how to use web service 730. Web services client 700 may develop distributed data processing application 725, which incorporates web service 730 and other web services (not shown). To ease the administrative burden of tracking changes to the web services used by application 725, web services client 700 may turn to change notification aggregator 715 to obtain relevant change notifications.

Change notification aggregator 715 may subscribe to receive UDDI change notifications from UDDI server 740, and may build and maintain its own data structures 795 and/or use information services from UDDI server 740. System 785 may also monitor resources outside UDDI (for example, dynamically-generated WSDL interface documents from system 765 at web service provider 705), and may receive and aggregate change-like messages from web service provider 705 and others.

Change notifications (and similar messages) may be transmitted to web services client 700 asynchronously, as they arise, or batched and transmitted in response to a polling request. Change notification aggregator may publish the change aggregation service to UDDI server 740 as a derivative web service, and may accept requests from web services client 700 and others according to established client/server interaction protocols.

Embodiments of the invention may be implemented as a separate web service built on intrinsic data services provided by an information broker, as shown in FIG. 7. Other embodiments may combine the information broker 705 and change notification aggregator 715 administrative domains—in effect, merging the change notification functionality with a standard UDDI information broker. Other logical functions shown in FIG. 7 and described above may also be moved from one place to another.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), and Electrically Erasable Programmable Read-Only Memory (EEPROM).

The applications of the present invention have been described largely by reference to specific examples and in terms of particular allocations of functionality to certain hardware and/or software components. However, those of skill in the art will recognize that selection of appropriate distributed data processing service interfaces can also be performed by software and hardware that distribute the functions of embodiments of this invention differently than herein described. Such variations and implementations are understood to be captured according to the following claims.

We claim:

1. A method, comprising:

creating, on a server device having access to a plurality of hierarchical data structures, a virtual hierarchical data structure from elements of the plurality of hierarchical data structures, wherein each of the plurality of hierarchical data structures describes a respective plurality of web services, and wherein the virtual hierarchical data structure describes only web services relied upon by a distributed application;

receiving, by the server device, a request for a subscription to the virtual hierarchical data structure to enable execution of the distributed application;

receiving, by the server device, a change notification regarding a first hierarchical data structure of the plurality of hierarchical data structures;

determining, by the server device, whether the virtual hierarchical data structure contains elements based on the first hierarchical data structure; and modifying, by the server device, the virtual hierarchical data structure based on the change notification when the virtual hierarchical data structure contains elements based on the first hierarchical data structure.

2. The method of claim 1, further comprising:
transmitting, by the server device, the change notification when the virtual hierarchical data structure contains elements based on the first hierarchical data structure.

3. The method of claim 1, wherein the plurality of hierarchical data structures are contained on the server device.

4. The method of claim 1, further comprising:
wherein the change notification comprises a deprecate change notification associated with a deprecated service; and
providing, by a service provider, the deprecated service during a transition period.

5. The method of claim 1, further comprising:
monitoring, by a monitoring device, a resource representing at least one of the respective plurality of web services;
generating, by the monitoring device, a change notification if the resource is modified; and
transmitting, from the monitoring device to the server device, the generated change notification.

6. The method of claim 5, wherein the resource comprises a Web Services Description Language ("WSDL") interface description document that is linked from within at least one of the plurality of hierarchical data structures.

7. The method of claim 1, further comprising:
establishing, by the server device, a subscription with an information broker to receive the change notification.

8. The method of claim 7, wherein the information broker comprises a Universal Description Discovery and Integration ("UDDI") server.

9. A computer-readable storage medium containing stored instructions to cause a processor executing the instructions to perform operations comprising:
creating, on a server device having access to a plurality of hierarchical data structures, a virtual hierarchical data structure from elements of the plurality of hierarchical data structures, wherein each of the plurality of hierarchical data structures describes a respective plurality of web services, and wherein the virtual hierarchical data structure describes only web services relied upon by a distributed application;
receiving, by the server device, a request for a subscription to the virtual hierarchical data structure to enable execution of the distributed application;
receiving, by the server device, a change notification regarding a first hierarchical data structure of the plurality of hierarchical data structures;
determining, by the server device, whether the virtual hierarchical data structure contains elements based on the first hierarchical data structure; and
modifying, by the server device, the virtual hierarchical data structure when the virtual hierarchical data structure contains elements based on the first hierarchical data structure based on the change notification.

10. The medium of claim 9, wherein the operations further comprise:
transmitting, by the server device, the change notification when the virtual hierarchical data structure contains elements based on the first hierarchical data structure.

11. The medium of claim 10, wherein the transmitting further comprises:
transmitting the change notification in response to a polling query from a client device.

12. The medium of claim 10, wherein the transmitting further comprises:
transmitting a change token, as part of the change notification, to permit classifying a change category.

13. A system, comprising:
a processor coupled to a memory to store a virtual hierarchical data structure;
means for creating the virtual hierarchical data structure;
means for receiving a request for a subscription to the virtual hierarchical data structure;
means for receiving a change notification; and
means for filtering the change notification.

14. The system of claim 13, further comprising:
means for transmitting the change notification.

15. The system of claim 13, further comprising:
means for monitoring a resource representing at least one of the plurality of web services;
means for generating the change notification to be received if the resource is modified; and
means for transmitting the generated change notification.

16. A method, comprising:
creating, on a server device having access to a plurality of hierarchical data structures, a virtual hierarchical data structure from elements of the plurality of hierarchical data structures, wherein each of the plurality of hierarchical data structures describes a respective plurality of web services, and wherein the virtual hierarchical data structure describes only web services relied upon by a distributed application;
transmitting, by a client device to the server device, a request for a subscription to the virtual hierarchical data structure to enable execution of the distributed application;
receiving a change notification, at the server device, regarding a first hierarchical data structure of the plurality of hierarchical data structures;
determining, by the server device, whether the virtual hierarchical data structure contains elements based on the first hierarchical data structure; and
modifying, by the server device, the virtual hierarchical data structure based on said determination.

17. The method of claim 16, further comprising:
transmitting the change notification from the server device to the client device if the virtual hierarchical data structure contains elements based on the first hierarchical data structure.

18. The method of claim 17, wherein said transmitting from the server device occurs responsive to polling the server device by the client device.

19. The method of claim 16, wherein the server device receives the change notification from a Universal Description Discovery and Integration ("UDDI") information broker.

* * * * *